United States Patent
Denniston

[11] Patent Number: 6,029,462
[45] Date of Patent: *Feb. 29, 2000

[54] DESICCANT AIR CONDITIONING FOR A MOTORIZED VEHICLE

[76] Inventor: James G. T. Denniston, 5425 Mainsail La., Hermitage, Tenn. 37076

[*] Notice: This patent issued on a continued prosecution application filed under 37 CFR 1.53(d), and is subject to the twenty year patent term provisions of 35 U.S.C. 154(a)(2).

[21] Appl. No.: 08/925,638

[22] Filed: Sep. 9, 1997

[51] Int. Cl.⁷ .................................................. F25D 17/06
[52] U.S. Cl. .................................. 62/94; 62/271; 62/244
[58] Field of Search ..................................... 62/94, 91, 92, 62/97, 271, 239, 244, 235.1, 323.1, 323.2, 171, 176.1, 176.4, 176.6, 177, 186

[56] References Cited

U.S. PATENT DOCUMENTS

| | | | |
|---|---|---|---|
| 1,541,147 | 6/1925 | Ikeda et al. | 62/94 |
| 2,075,036 | 3/1937 | Hollis | 62/94 X |
| 3,774,374 | 11/1973 | Dufour et al. | 55/316 |
| 3,844,737 | 10/1974 | Macriss et al. | 55/34 |
| 4,093,435 | 6/1978 | Marron et al. | 55/269 |
| 4,113,004 | 9/1978 | Rush et al. | 165/3 |
| 4,171,624 | 10/1979 | Meckler et al. | 62/271 |
| 4,180,985 | 1/1980 | Northrup, Jr. | 62/271 X |
| 4,228,847 | 10/1980 | Lindahl | 165/10 |
| 4,255,171 | 3/1981 | Dravnieks | 55/269 |
| 4,408,660 | 10/1983 | Sutoh et al. | 165/21 |
| 4,424,933 | 1/1984 | Sutoh et al. | 236/44 A |
| 4,594,860 | 6/1986 | Coellner et al. | 62/271 |
| 4,700,550 | 10/1987 | Rhodes | 62/271 |
| 4,729,774 | 3/1988 | Cohen et al. | 55/181 |
| 4,887,438 | 12/1989 | Meckler | 62/271 |
| 4,982,575 | 1/1991 | Besik | 62/271 |
| 5,014,816 | 5/1991 | Dear et al. | 181/229 |
| 5,042,266 | 8/1991 | Yamashita et al. | 62/271 |
| 5,170,633 | 12/1992 | Kaplan | 62/94 |
| 5,224,373 | 7/1993 | Williams et al. | 73/29.02 |
| 5,276,166 | 1/1994 | Swarup et al. | 548/952 |
| 5,296,541 | 3/1994 | Swarup et al. | 524/556 |
| 5,297,398 | 3/1994 | Meckler | 62/271 |
| 5,335,719 | 8/1994 | Khelifa et al. | 62/271 X |
| 5,351,497 | 10/1994 | Lowenstein | 62/271 X |
| 5,386,952 | 2/1995 | Nordstrom et al. | 244/118.1 |
| 5,388,423 | 2/1995 | Khelifa | 62/271 |
| 5,435,150 | 7/1995 | Khelifa et al. | 62/94 X |
| 5,509,275 | 4/1996 | Bhatti et al. | 62/271 |
| 5,512,083 | 4/1996 | Dunne | 95/113 |
| 5,514,035 | 5/1996 | Denniston | 454/121 |
| 5,661,983 | 9/1997 | Groten et al. | 62/271 |

OTHER PUBLICATIONS

The Air Conditioning, Heating and Refrigeration News, "Tapping the Sun for Cooling Power," Business News Publishing Co., Aug. 24, 1992.

(List continued on next page.)

*Primary Examiner*—William C. Doerrler
*Attorney, Agent, or Firm*—Waddey & Patterson; Lucian Wayne Beavers

[57] ABSTRACT

Cooling air to be provided to a passenger cabin of a motorized vehicle is generated using a desiccant-based moisture collector, a heat exchanger, and an evaporator/condenser unit, such as a rotating evaporator/condenser wheel. High temperature air that has a temperature sufficient to evaporate moisture from desiccant of the moisture collector and into the air is directed into the moisture collector so that humidified air exits the moisture collector. The humidified air is directed into a condensation section of the evaporator/condenser unit so that moisture condenses from the humidified air onto a surface of the evaporator/condenser unit. Low temperature air having a temperature low enough that the desiccant of the moisture collector collects moisture from the air and dehumidified air exits the moisture collector is directed into the moisture collector. The dehumidified air is directed through a heat exchanger to cool the dehumidified air, and the cooled, dehumidified air is directed through an evaporator section of the evaporator/condenser unit to humidify and further cool the air to produce a cold, moist air stream that is directed into the passenger cabin of the motorized vehicle.

32 Claims, 9 Drawing Sheets

OTHER PUBLICATIONS

Air Conditioning, Heating, Ventilation & Refrigeration Service Reporter, "Solar Air Conditioning Trial at Florida KFC Resturant," Jul. 1992.

Consumer Reports, "Breathing on a Jet Plane," vol. 59, No. 8, Consumers Union, New York (Aug. 1994), pp. 501–506.

Miller et al., "Integrated Thermal Desiccant Cooling to Address High Humidity Interiors, " Paper for the National Solar Energy Conference, Jun. 13–18, 1992.

Schuchardt et al., "An Air Induction System for a Four–Cylinder Engine: Design, Noise Control and Engine Efficiency," SAE Technical Paper Series, No. 931317, Warrendale, PA 15096–0001 (1993), pp. 1–6.

The Tampa Tribune, "Utility, Firm to Test New Air–Conditioner Design," Tampa, Florida, May 8, 1992.

Psychometric chart, showing statistics prepared by the American Society of Heating, Refrigerating and Air–Conditioning Engineers Standard 55–1961.

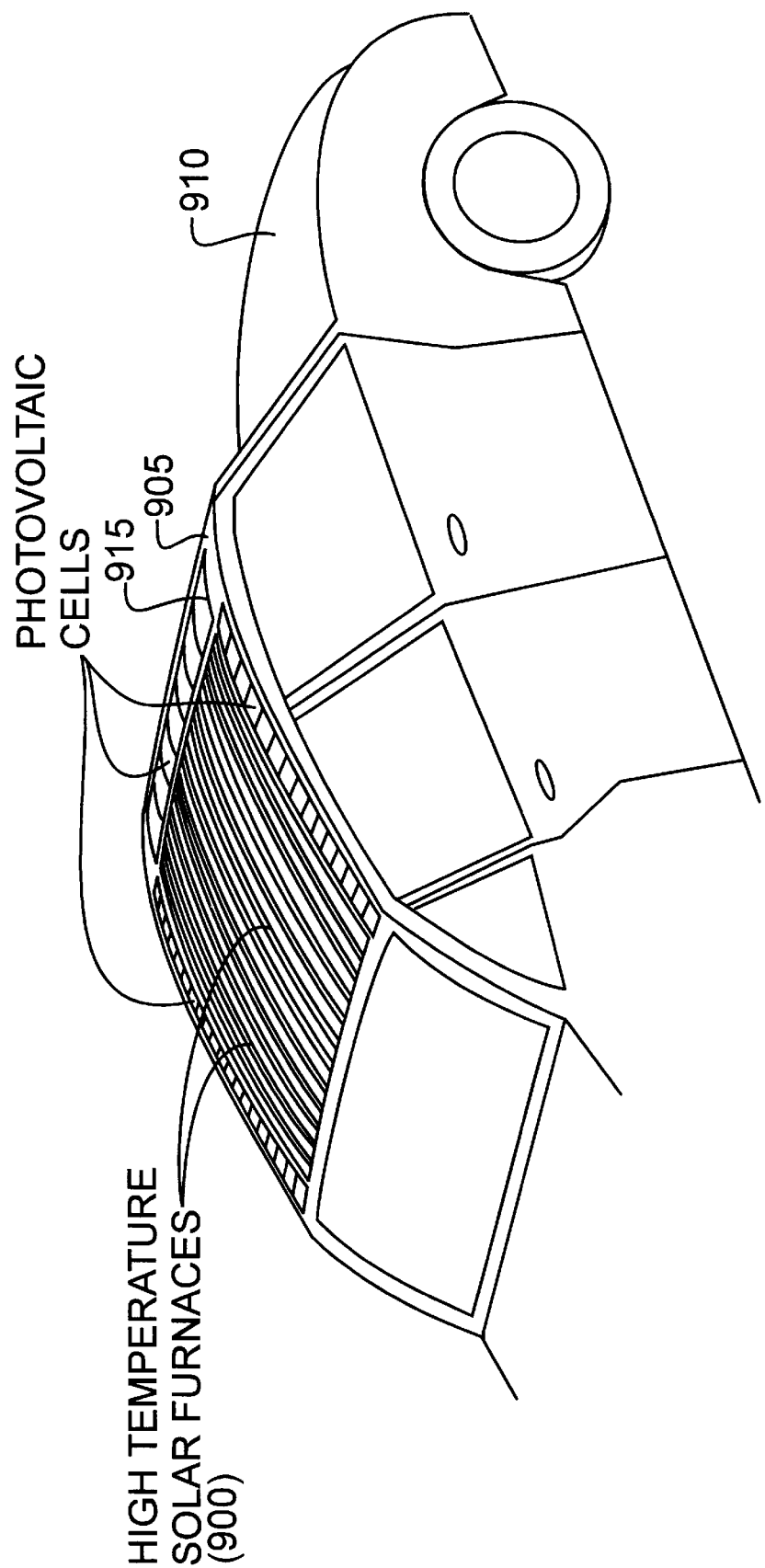

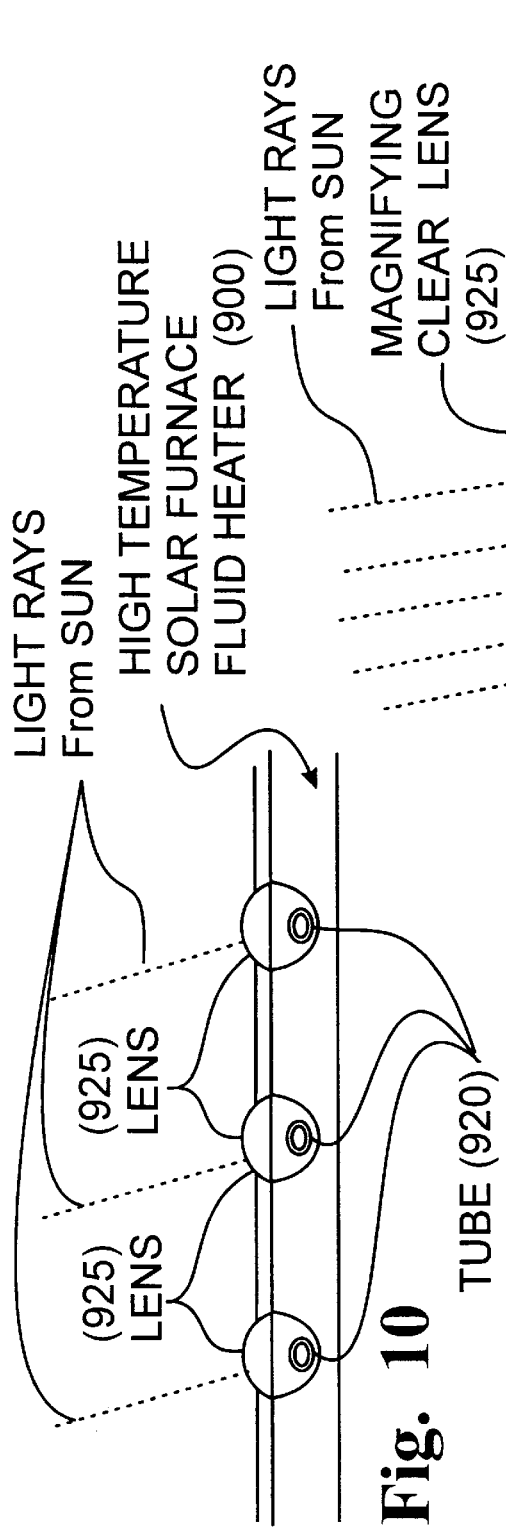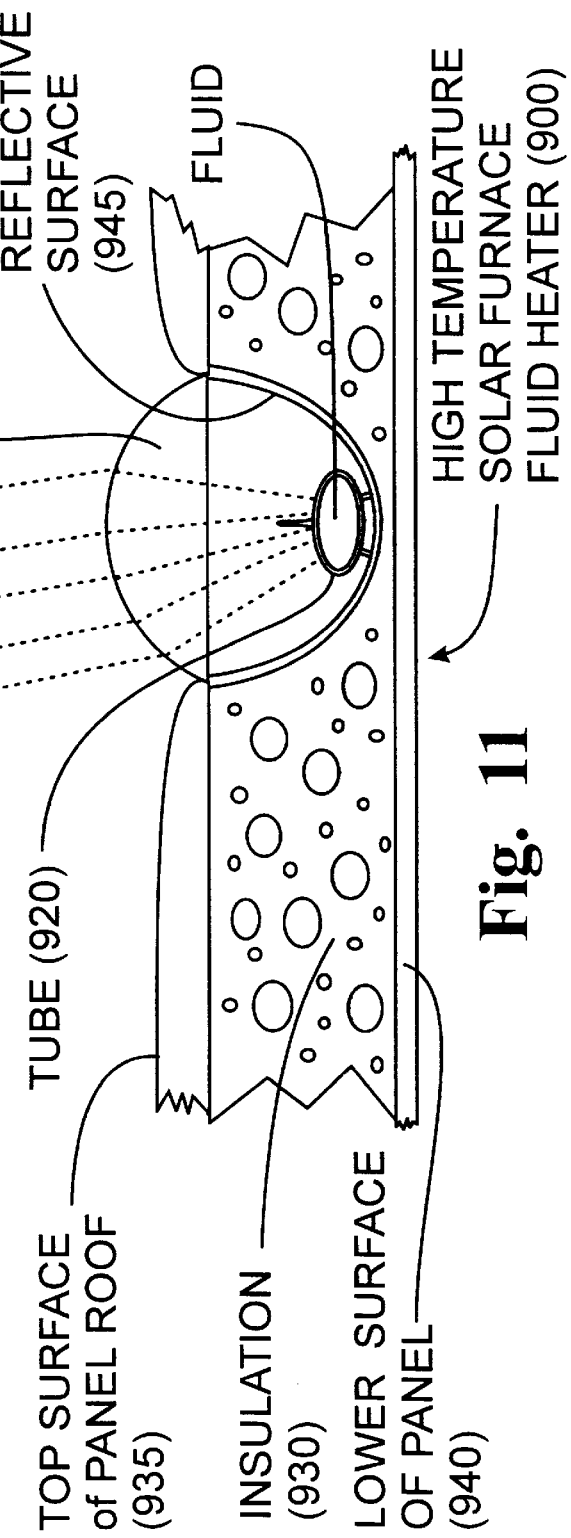

DESICCANT AIR CONDITIONING FOR A MOTORIZED VEHICLE

BACKGROUND

The invention relates to desiccant air conditioning for a motorized vehicle.

Desiccants have been used previously in conjunction with compressor-based air conditioning systems used to cool buildings. In such systems, desiccants dehumidify an air stream prior to compressor-based cooling. The dehumidification enhances the air conditioner's efficiency. Other building systems use a desiccant to provide a dry air stream that is cooled through the evaporation of moisture supplied from an external water source. Desiccant-based systems also have been used to regulate the relative humidity level of air in a building.

Previous desiccant-based air conditioning systems for motorized vehicles have employed an onboard water storage tank that was replenished periodically as the water in the holding tank was consumed for evaporative cooling.

SUMMARY

In one aspect, generally, the invention features providing cooling air to a passenger cabin of a motorized vehicle. The cooling air is generated by directing high temperature air into a desiccant-based moisture collector, where the high temperature air has a temperature sufficient to evaporate moisture from desiccant of the moisture collector and into the air so that humidified air exits the moisture collector. The humidified air from the moisture collector is directed into a condensation section of an evaporator/condenser unit so that moisture condenses from the humidified air onto a surface of the evaporator/condenser unit. Low temperature air also is directed into the moisture collector. The low temperature air has a temperature low enough that the desiccant of the moisture collector collects moisture from the air and dehumidified air exits the moisture collector. The dehumidified air is directed through a heat exchanger to cool the dehumidified air, and the cooled, dehumidified air is directed through an evaporator section of the evaporator/condenser unit to humidify and further cool the air to produce a cold, moist air stream. The cold, moist air stream is directed into the passenger cabin of the motorized vehicle.

Embodiments of the invention may include one or more of the following features. The desiccant-based moisture collector may be a rotatable wheel that includes the desiccant in air passages between a first side of the wheel and a second side of the wheel. The moisture collector also may include a first region where the high temperature air enters the moisture collector, a second region where the low temperature air enters the moisture collector, a third region opposite the first region where the humidified air exits the moisture collector, and a fourth region opposite the second region where the dehumidified air exits the moisture collector. The rotatable wheel may be rotated so that desiccant on the wheel is alternately exposed to the first region and the second region.

The desiccant-based moisture collector may include a canister that contains desiccant and includes an inlet and an outlet, an inlet valve connected to the inlet of the canister, and an outlet valve connected to the outlet of the canister. The inlet valve may be controlled to alternately direct the high temperature air and the low temperature air through the canister, and the outlet valve may be controlled so that air exiting the canister is directed to the condensation section of the evaporator/condenser unit when high temperature air is directed through the canister and is directed to the heat exchanger when low temperature air is directed through the canister. A second canister that contains desiccant may receive the high temperature air when the low temperature air is directed through the first canister and the low temperature air when the high temperature air is directed through the first canister. The inlet and outlet valves may be a pair of connected cross-over valves.

The high temperature air may be generated using excess engine heat or solar energy.

The evaporator/condenser unit may include a rotatable wheel having air passages between a first side of the wheel and a second side of the wheel. The rotatable wheel may be rotated so that a particular air passage is positioned alternately in the evaporation section and the condensation section of the evaporator/condenser unit.

A cool air stream may be generated using a compressor-based evaporator. The cool air stream then may be directed through the evaporator/condenser unit. The cooled, dehumidified air from the heat exchanger may be directed through a compressor-based evaporator to produce a cold, dry air stream that is directed into the passenger cabin of the motorized vehicle. This promises to increase the efficiency of the compressor-based evaporator, since the removal of water before compressor-based cooling reduces the cooling load on the system.

The relative humidity in the passenger cabin of the motorized vehicle may be controlled by allocating the cooled, dehumidified air between the evaporator section of the evaporator/condenser unit and the compressor-based evaporator. A system controller may maintain the humidity level in the cabin at a desired, comfortable humidity level set by a passenger of the vehicle. For example, humidity levels between 30% and 60% have been found to be comfortable levels under many conditions. The system controller may measure the relative humidity level in the passenger cabin and control the relative humidity in the passenger cabin based on a difference between the measured relative humidity level and the desired relative humidity level.

The passenger cabin may be heated and humidified by directing the humidified air that exits the moisture collector into the passenger cabin. The dehumidified air that exits the moisture collector, or the cooled, dehumidified air that exits the heat exchanger, may be directed to the windshield of the motorized vehicle. Current industry standards provide for windshield defogging and deicing within twenty minute of engine startup. The nearly-instantaneous heat generated by adsorption of water into the desiccant of the moisture collector promises to provide windshield defogging and deicing at a much faster rate (e.g., within five minutes), which should offer tremendous safety benefits.

The invention provides desiccant air conditioning for a motorized vehicle. Cooling below ambient temperature is provided through the evaporation of condensed moisture into a dehydrated and cooled air stream, and does so without an external water supply. A desiccant is used to dehydrate the air stream prior to evaporative cooling. Energy for desiccant regeneration is provided by heat supplied from sources such as excess engine heat or solar energy. Solar-powered desiccant air conditioning will provide cooling for petroleum-powered vehicles during periods of engine shut-off, as well as for electric-powered vehicles. The system uses low level power to operate components that move air streams through the system (e.g., energy-efficient fans), rotating components (e.g., a desiccant wheel, heat exchanger wheels and an evaporator/condenser wheel), valves, and component controllers. Other desiccant-based systems for motorized vehicles are described in U.S. Pat. No. 5,514,035, entitled "DESICCANT BASED CABIN WINDSHIELD DEFOG/DEFROST SYSTEM", and U.S. application Ser. No. 08/771,892, filed Dec. 23, 1996 and entitled "DESICCANT BASED HUMIDIFICATION/ DEHUMIDIFICATION SYSTEM", both of which are incorporated by reference.

Evaporative cooling of an air stream below ambient temperature is achieved after the air stream is subjected to a desiccant adsorption process that removes moisture from the air stream. This removal of moisture significantly reduces the relative humidity of the air stream while increasing the temperature of the air stream. After the air stream is heated and dried, the air stream is cooled by passing the air stream through an air-to-air heat exchanger or similar heat transfer component to reduce the temperature of the dry air stream to near the ambient temperature. The dry air stream then passes over the surface of an evaporator section of an evaporator/condenser unit (e.g., an evaporator/condenser wheel) that has been coated previously with a thin layer of condensation. Evaporation of this condensation into the dry air stream results in evaporative cooling of the air stream below the ambient temperature.

The layer of condensation is formed on the surface of the evaporator/condenser unit when a warm, moist air stream passes over the cool surface of the condenser section of the evaporator/condenser unit. The warm, moist air stream is supplied by the desiccant regeneration process, which releases moisture from the desiccant material through a thermodynamic reaction.

Desiccant regeneration includes passing a hot air stream through the desiccant unit and converting moisture that was adsorbed previously by the desiccant unit into water vapor. The hot regeneration air stream drives the moisture out of the desiccant and captures the water vapor. The air stream that departs the regeneration section of the desiccant unit has a lower temperature and a higher relative humidity than the air that enters that section.

Advantages of desiccant air conditioning relative to compressor-based air conditioning cooling systems include a substantial reduction in the mechanical energy required to power the system. Compressor-based air conditioners generally are powered by mechanical energy from the vehicle's engine, which limits operation of the air conditioner to times when the vehicle's engine is operating. As a result, when the engine is not operating, the vehicle's cabin temperature may increase to very high levels, especially if the vehicle is exposed to direct sunlight. This elevated temperature may result in the compressor-based system needing to deliver a large volume of cold air to the cabin at engine startup. By contrast, a desiccant air conditioner powered by solar energy can maintain a cool cabin while the vehicle's engine is turned off. When the vehicle's engine is started and the engine temperature increases, excess engine heat may be used for increased desiccant regeneration. Engine operation also provides additional power to move a greater volume of air through the other components of the system.

Desiccant air conditioning also provides cool air having a high relative humidity. By contrast, compressor-based air conditioner systems generally produce cold air having a low relative humidity. This dry cold air may cause discomfort to the occupants of the cabin. For example, passengers may experience dry and irritated eyes as the compressor-based air conditioner lowers the relative humidity in the cabin during cooling.

The invention provides energy efficient and comfortable air conditioning, relative humidity control in the cabin, and windshield defog, defrost and deicing for motorized vehicles. The invention may use different types of high efficiency desiccants that are coated on or impregnated in a structure. Suitable structures include, but are not limited to, corrugation, folded paper, honeycomb or variations of honeycomb. The desiccant structures should provide high surface exposure in a confined space with minimum resistance to the flow of air. The desiccant may be incorporated into a slowly-rotating desiccant wheel or alternating canisters with a cross-over valve assembly.

Other features and advantages will be apparent from the following description, including the drawings, and from the claims.

BRIEF DESCRIPTION OF THE DRAWINGS

FIG. 9 is a perspective view of an automobile configured to employ a solar-powered, desiccant-based air conditioning system.

FIGS. 10 and 11 are side views of a solar furnace of the vehicle of FIG. 9.

DESCRIPTION

Figure 1:
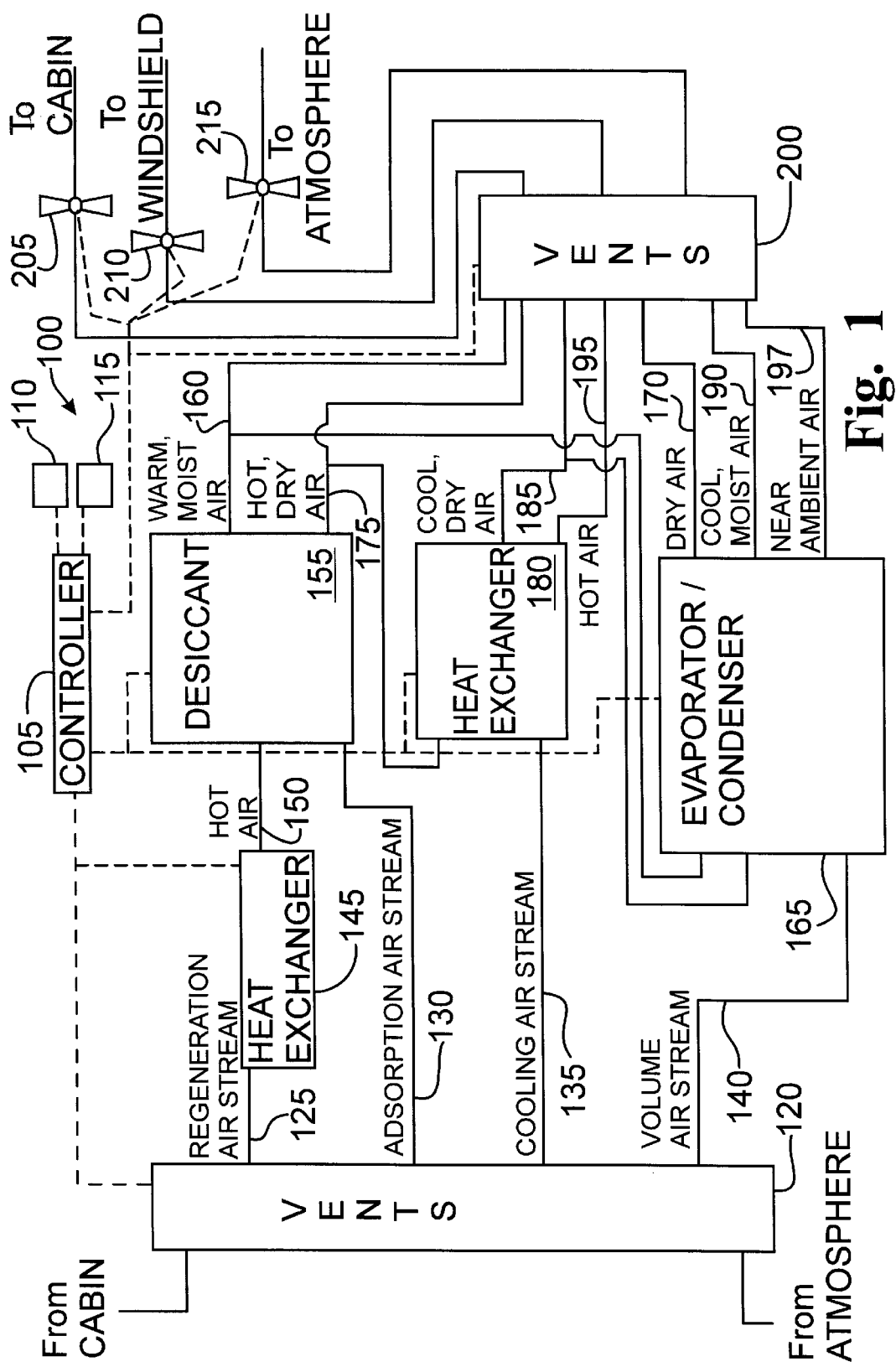
FIG. 1 is a block diagram of a desiccant-based air conditioning system.

Referring to FIG. 1, a desiccant-based air conditioning system 100 for a motorized vehicle is controlled by a controller 105. The controller 105 receives signals from sensors 110 and from user-manipulable control mechanisms 115. The sensors may measure the temperature and humidity of the air in the cabin of the vehicle, the temperature of the vehicle windshield, and the level of condensation on the windshield. Other sensors may measure the humidity and temperature outside of the vehicle or the temperature and operating parameters of system components.

The system 100 receives air from the vehicle cabin and from the external atmosphere. The controller 105 controls a set of inlet vents 120 that combine the two sources of air to generate four air streams: a regeneration air stream 125, an adsorption air stream 130, a cooling air stream 135, and a volume air stream 140.

The regeneration air stream 125 is directed to a heat exchanger 145 that heats the air stream to produce a hot air 150. The heat exchanger 145 may be heated, for example, using excess heat from the engine of the motorized vehicle.

The hot air stream 150 then passes through a desiccant 155 to remove moisture from the desiccant and thereby regenerate the desiccant. The desiccant 155 may be implemented, for example, using a rotating desiccant wheel or using a series of suitably-valved desiccant canisters. The hot air stream 150 is cooled by evaporative cooling and exits the desiccant 155 as a warm, moist air stream 160.

The warm, moist air stream 160 enters an evaporator/condenser ("E/C") 165. The E/C 165 may be implemented as a rotating wheel having a condensation portion through which the air stream 160 passes and an evaporation portion. Within the E/C 165, moisture condenses out of the air stream 160 so that a dry air stream 170 exits the E/C 165. In some instances, the warm moist air stream 160 may bypass the E/C 165 and be provided to the cabin of the vehicle for use in heating the cabin air and increasing the relative humidity in the cabin. Similar results may be obtained by halting rotation of the E/C 165 when the E/C is implemented as a rotating wheel.

The adsorption air stream 130 also passes through a portion of the desiccant 155. Moisture is removed from the air stream 130 by desiccant adsorption, which results in dehumidification of the air stream 130 and a significant increase in the temperature of the air stream 130 so that a hot, dry air stream 175 exits the desiccant 155.

The hot, dry air stream 175 passes through a heat exchanger 180 that cools the air to produce a cool, dry air stream 185 through an evaporation section of the E/C 165. Moisture from the E/C 165 evaporates into the stream 185 to produce a stream of cool, moist air 190. In particular, when the cool dry air 185 contacts the moisture on the E/C 165, a thermodynamic reaction ensues. The reaction results in substantial evaporative cooling, which may lower the temperature of the air stream 190 below the ambient temperature and adds moisture to the air stream.

The cooling air stream 135 cools the heat exchanger 180. As such, the cooling air stream 135 is heated while passing through the heat exchanger 180 so that a hot air stream 195 exits the heat exchanger 180.

The volume air stream 140 controls the flow rate/volume of air entering the E/C 165. The flow rate of the air stream 140 may be varied to control the flow through the system. The air stream 140 provides additional cooling of the E/C 165 and exits the E/C 165 as a near ambient air stream 197. In another variation, the volume air stream 140 may be a cool air stream provided by a traditional, compressor-based air conditioning system.

The controller 105 controls a set of outlet vents 200 that control the portion of each air stream that is provided to the vehicle cabin, the vehicle windshield, and the external atmosphere. Fans 205, 210 and 215, which also are controlled by the controller 105, direct the resulting air streams to, respectively, the vehicle cabin, the vehicle windshield, and the external atmosphere.

The system 100 also may be used to improve the efficiency of a traditional, compressor-based air conditioning system by providing the cool, dry air stream 185 to the compressor-based evaporator of such a system. The desiccant's removal of humidity from the air stream reduces the energy needed by the compressor-based system to cool the air. Similarly, the relative humidity level in the vehicle's cabin may be controlled by the ratio of the desiccant-based cool air stream, which has a high relative humidity, to the compressor-based cool air stream, which has a low relative humidity. The controller 105 controls the relative proportion of each cool air stream that enters the cabin to regulate the relative humidity level of the cool air entering the cabin.

An analogous process is followed when cabin air heating is desired. The relative humidity level in the cabin may be controlled by increasing or decreasing the relative humidity level of the air stream directed into the cabin. For example, the cabin air's relative humidity may be increased by directing the stream of warm, moist air 160 directly into the cabin. The air stream also may be passed through an additional heat source, as desired.

Windshield defrosting, defogging or deicing may be provided by directing the hot, dry air stream 175 against the windshield. Defogging or deicing may be activated automatically when sensor readings indicate that condensation has formed or will soon form on the windshield, and may be deactivated automatically when sensor readings indicate that the relative humidity has been suitably decreased and condensation has been removed.

FIGS. 2–6 illustrate a particular implementation of the system 100 of FIG. 1. For ease of illustration, an enclosure that supports the components and channels the air streams through the components is not shown. For the same reason, fans and ducts that move and direct the air streams through the system, vents that direct the air streams and may be closed when the system is turned off to seal the desiccant from atmospheric moisture, the controller that regulates operation of the system, and the sensors that transmit information to the controller also are not shown.

Figure 2:
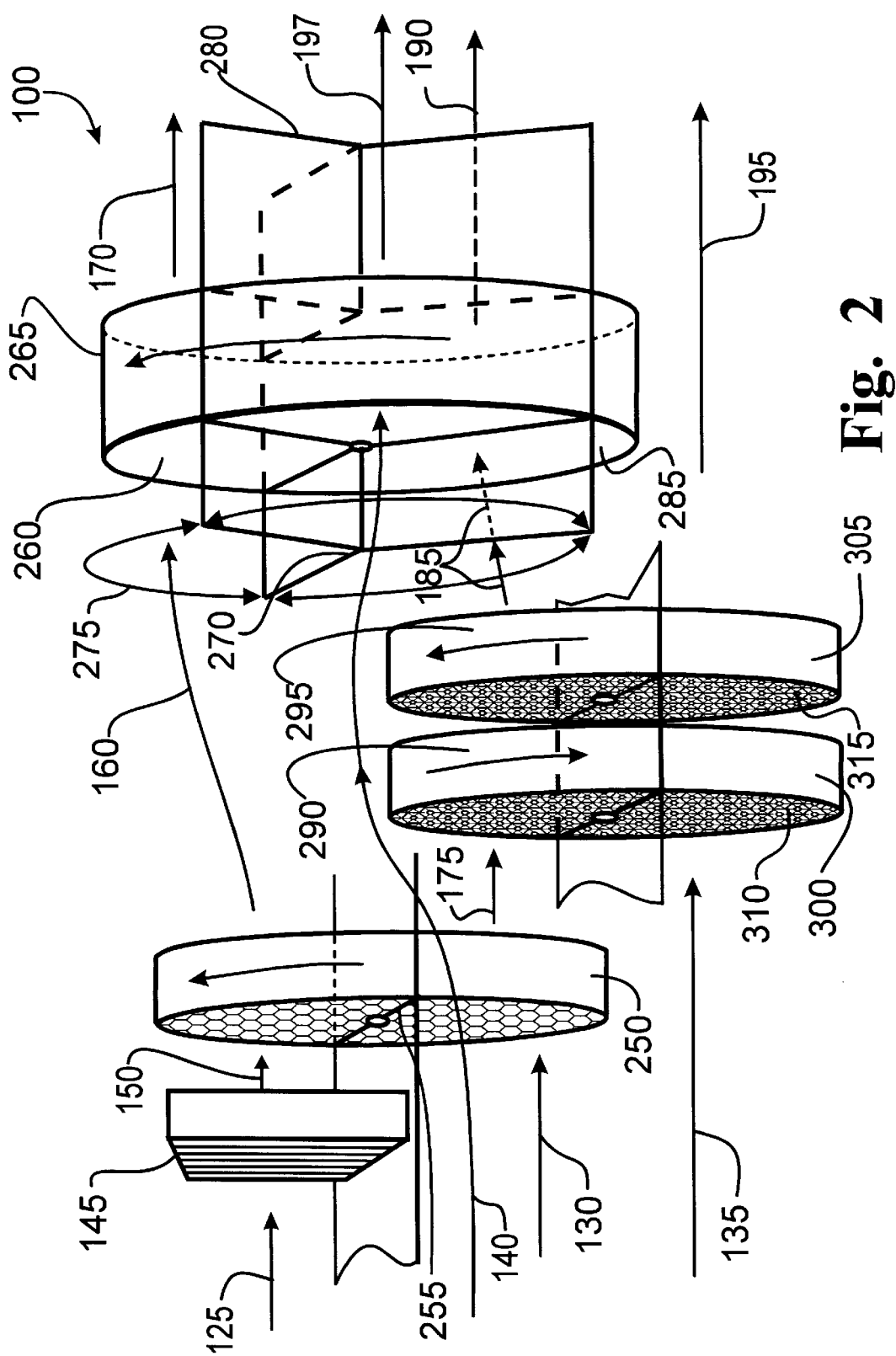
FIG. 2 is a block diagram of an implementation of the system of FIG. 1.

Referring to FIG. 2, the heat exchanger 145 heats the regeneration air stream 125, which may include fresh ambient air from outside the vehicle or recirculated air from the cabin of the vehicle. The heated air stream 150 that exits the heat exchanger 145 is heated to a temperature between 140° F. and 250° F. or more as it passes through the heat exchanger 145. The upper limit of the temperature corresponds to temperature limitations of the materials exposed to the heated air. In general, the hot air stream 150 exits the heat exchanger 145 with a temperature that is sufficient to regenerate the desiccant material.

The air stream 150 passes through a rotating desiccant wheel 250, which corresponds to the desiccant 155 of FIG. 1. A brush-type air seal 255, or a similarly functioning seal, contacts the wheel 250 to ensure that air from the air stream 150 does not bypass the wheel 250. Additional seals (not shown) are provided on the sides of the wheel 250 and around other moving components (e.g., heat exchanger and evaporator/condenser wheels) of the system to prevent air bypass. The brush-type seal 255 contacts the desiccant wheel 250 with a minimal amount of force to prevent unnecessary friction as the wheel 250 turns. The hot air stream 150 enters the upper section of the desiccant wheel 250 as the desiccant wheel 250 slowly rotates in the path of the air stream 150. The rotational speed of the desiccant wheel 250 may be varied between several revolutions per minute to several minutes for each revolution, depending on the velocity and temperature of the air stream 150 and the effective performance of the desiccant. Moisture previously adsorbed into the desiccant is released by evaporation into the air stream 150. Since the evaporation is an endothermic reaction, a warm, moist air stream 160 exits the upper portion of the desiccant wheel 250.

The desiccant wheel 250 may be constructed of a material such as NOMEX honeycomb or of a similar structure with a large surface area. The desiccant wheel 250 also may be constructed from durable paper material with the desiccant either coated on the surface of the paper or impregnated into the paper. The large surface area of the wheel provides maximum exposure to the hot air stream 150 as the air stream passes through the small channels of the desiccant wheel 250. The channels are open on each side to allow a free flow of air through the desiccant wheel 250 while maximizing exposure to the thin layer of desiccant coated on the surface of the structure.

The warm, moist air stream 160 exits the desiccant wheel 250 with a reduction in temperature relative to the hot air stream 160. The temperature difference between the air streams 150, 160 may be as much as 100° F. In conjunction with the temperature drop, air stream 160 has significantly more moisture content than air stream 150. The warm, moist air stream 160 is directed into the condenser section 260 of a rotating evaporator/condenser ("E/C") wheel 265. An adjustable inlet duct 270 controls the portion 275 of the E/C wheel 265 that corresponds to the condenser section 260. An outlet duct 280 is adjusted similarly.

The E/C wheel 265 is constructed of materials capable of retaining and conducting heat, and may be similar in structure to the desiccant wheel 250, with the primary difference between the two being that the E/C wheel 265 is not coated with desiccant material. The wheel 265 may include a combination of NOMEX and either metal, ceramic or glass. The metal, ceramic or glass may be used to construct the wheel or may be inserted into the passages created by the cell structure of the wheel to adsorb heat from one air stream and transport the heat to another air stream. The metal, ceramic, or glass inserts provide sufficient mass to transport heat from one position to another.

Passing the air stream 160 through the condenser portion 260 of the E/C wheel 265 deposits moisture on the condenser portion 260 of the wheel 265. The inserts positioned in the E/C wheel 265 are cooler than the warm, moist air stream 160 as a result of the desiccant regeneration step described below. As a result, the moisture from the air stream 160 condenses on the surface of the cooler insert material. The E/C wheel 265 slowly rotates so that the section of the wheel corresponding to the condenser portion slowly changes. The speed of rotation may be varied to regulate the temperature and relative humidity levels of the air. As the wheel 265 rotates, the moisture on the surface of the inserts moves into the evaporation position 285 of the E/C wheel 265. After the E/C wheel 265 removes moisture, the dry air stream 170 exits the E/C wheel 265 and may be vented to the atmosphere.

As mentioned above, the warm, moist air stream 160 may be directed into the vehicle cabin without passing the air stream through the E/C wheel 265. This provides a source of heat and humidity for the cabin to increase the relative humidity level of the cabin air while heating the cabin.

The adsorption air stream 130 enters the system as either recirculated cabin air or as fresh ambient air. Air stream 130 first enters an adsorption portion of the desiccant wheel 250. Since the temperature of air stream 130 is relatively low, most of the moisture content of air stream 130 is adsorbed into the desiccant material coated on the desiccant wheel 250. Desiccant adsorption of moisture out of an air stream occurs when the temperature of the air stream is below the regeneration temperature (e.g., 140° F.). Depending on the efficiency of the desiccant and the properties of the air stream, 75% or more of the moisture content of the air stream may be adsorbed into the desiccant material. Since adsorption of moisture into the desiccant is an exothermic reaction, the air stream 130 is heated so that a hot, dry air stream 175 exits the desiccant wheel 250.

The hot, dry air stream 175 is directed into the top portions 290, 295 of a pair of counter-rotating heat exchanger wheels 300 and 305 (comparable to the heat exchanger 180 of FIG. 1) that lower the temperature of the air stream to near ambient. Other types of heat exchangers also may be used. As the hot, dry air stream 175 passes through the counter-rotating heat exchanger wheels 300 and 305, the heat added during the adsorption process is transferred to the heat exchanger wheels 300 and 305. As such, a dry air stream 185 that is near ambient temperature exits the heat exchanger wheels 300 and 305.

The dry air stream 185 is directed into the evaporator section 285 of the E/C wheel 265. As the dry air stream 185 passes through the evaporator section 285, the moisture placed on the wheel as it rotated through the condenser section 260 is evaporated into the air stream. The endothermic evaporative reaction results in cooling of the air stream 185, which exits the E/C wheel 265 as a cool, moist air stream 190. The cool air stream 190 then is directed into the cabin to cool the cabin.

Alternatively, air streams 160, 175 and 185 may be directed elsewhere for other purposes. As noted above, air stream 160 may bypass the E/C wheel 265 and be directed into the cabin to increase the temperature and relative humidity of the cabin. The hot, dry air stream 175 may be directed to the windshield of the vehicle to provide windshield defog, defrost, and deicing. The dry, near-ambient air stream 185, which is cooler than the hot, dry air stream 175, may be used to defog the windshield when less heat is needed. Air stream 185 also may be controlled to bypass the E/C wheel 265 and enter the cabin to lower the relative humidity of the cabin. In addition, air stream 185 may be used with a traditional compressor-based air conditioning system. When used in this manner, the dry, near-ambient air stream 185 is directed into the compressor-based evaporator of the conventional system. This increases the efficiency of the compressor-based system by lowering the cooling load on the system, since the moisture is removed before the compressor-based cooling of the air stream begins.

The cooling air stream 135 is directed into the lower portions 310 and 315 of the heat exchanger wheels 300 and 305 to remove heat from the wheels. The heat exchanger wheels 300 and 305 are heated as they rotate through the hot, dry air stream 175. The heat exchanger wheels 300 and 305 then release the heat into the cooling air stream 135, which exits the system as a heated air stream 195.

The volume air stream 140 passes through the E/C wheel 265 and serves to further cool the E/C wheel 265. The volume air stream 140 exits the E/C wheel 265 as a near ambient air stream 197.

Figure 3:
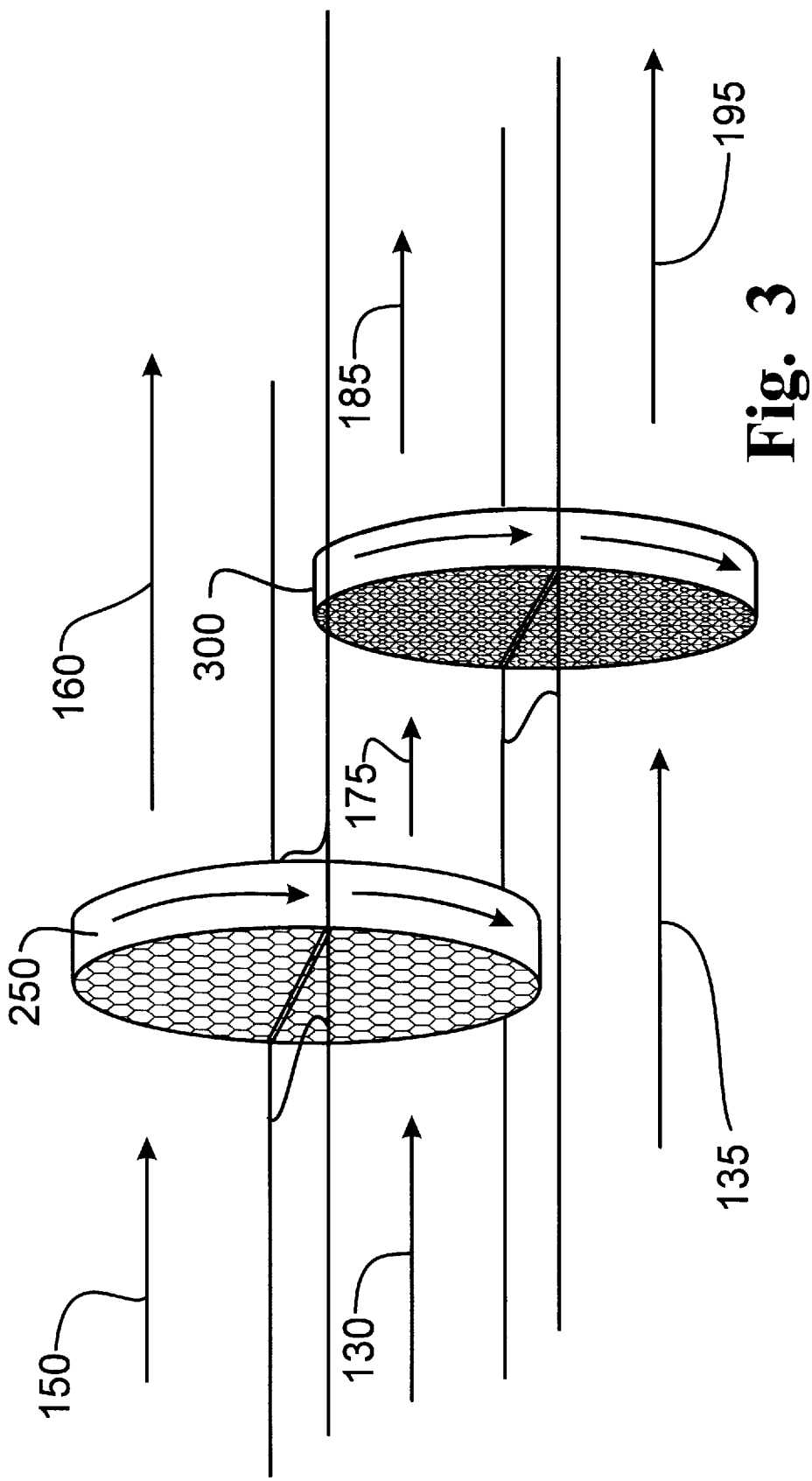
FIG. 3 is a block diagram showing air streams flowing through a desiccant wheel and a heat exchanger wheel of the system of FIG. 2.

FIG. 3 further illustrates flow of air streams through the desiccant wheel 250 and a heat exchanger wheel 300. As shown in FIG. 3, the heat exchanger 180 may be implemented with a single rotating wheel 300.

The hot air stream 150 is at a temperature sufficient to provide desiccant regeneration as the air stream passes through the upper portion of the desiccant wheel 250. Air stream 150 exits the upper portion of the desiccant wheel 250 as warm, moist air stream 160, with a lower temperature and a substantially increased relative humidity.

Air steam 130 enters the lower section of the desiccant wheel 250 at a temperature near room temperature or lower. Moisture from the air stream 130 is adsorbed by the desiccant material coated on the desiccant wheel 250 so that a hot, dry air stream 175 exits the desiccant wheel 250. The desiccant wheel 250 slowly rotates to continuously reposition the desiccant between the upper and lower portions so as to alternate the processes of adsorption and regeneration.

The elevated temperature of the air stream 175 is reduced by the heat exchanger wheel 300 so that a cool, dry air stream 185 exits the wheel 300. The temperature of the air stream 185 is near ambient, or room temperature. The heat exchanger wheel 300 is cooled by the air stream 135 so as to permit the heat exchanger wheel 300 to continually remove the heat generated by adsorption of moisture into the desiccant from the air stream 175. As the wheel 300 rotates, portions of the heat exchanger wheel 300 are moved continually from one air stream to the other.

Figure 4:
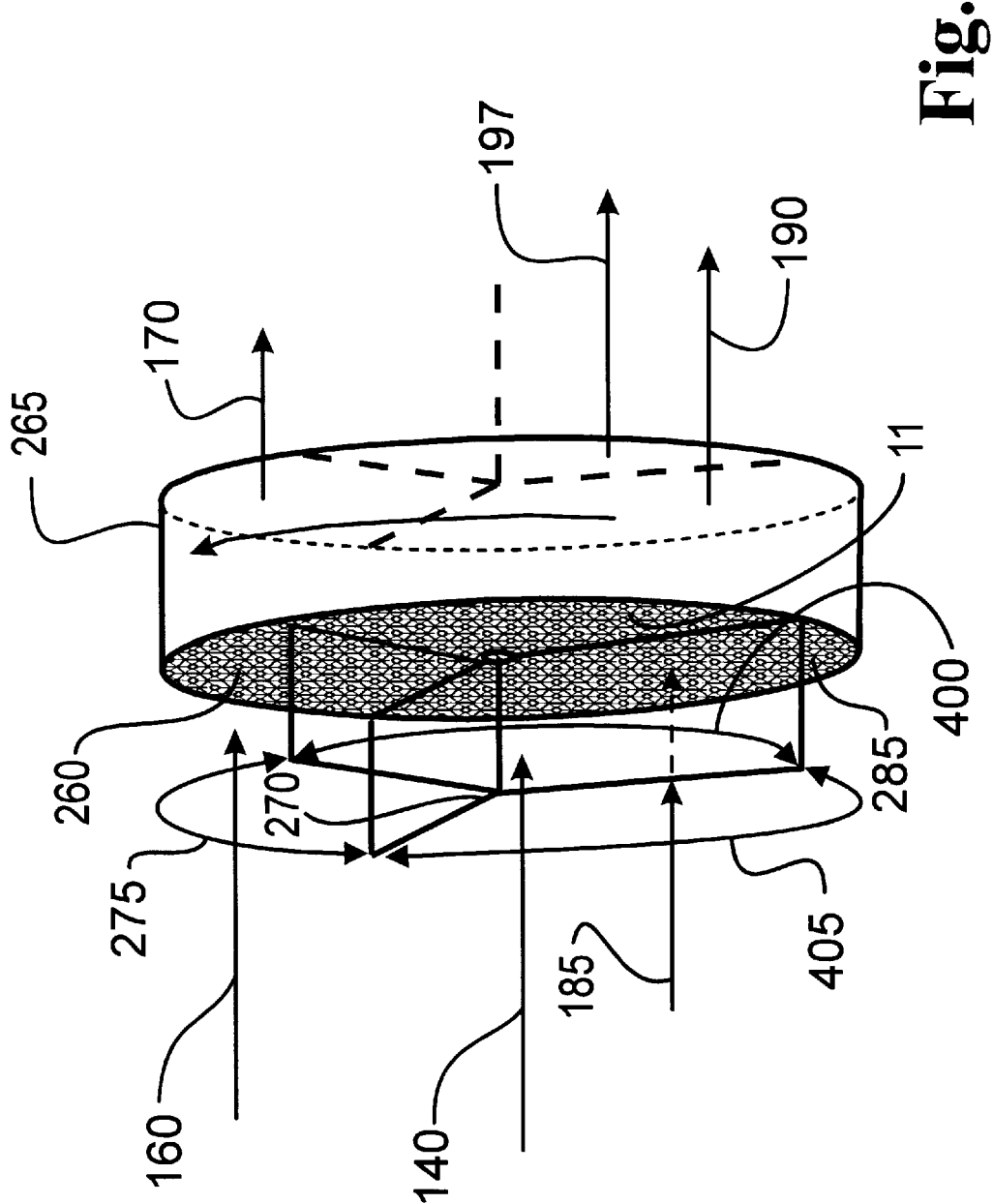
FIG. 4 is a block diagram showing air streams passing through an evaporator/condenser wheel of the system of FIG. 2.

FIG. 4 illustrates details of operation of the evaporator/condenser ("E/C") wheel 265. The adjustable inlet duct 270 may be adjusted to control the size of openings 275, 400 and 405 that receive, respectively, the warm, moist air stream 160, the volume air stream 140, and the cool, dry air stream 185. The opening 275 directs the warm, moist air stream 160 from the desiccant regeneration process into the condenser portion 260 of the E/C wheel 265. The opening 405 directs the dry air stream 185 into the evaporator portion 285 of the E/C wheel 265. The opening 400 directs the volume air stream 140 into the remaining portion 410 of the E/C wheel 265. The size of the openings 275, 400 and 405 may be varied by adjusting the inlet duct 270. For example, the opening 400 may be adjusted to a closed position so that the combined angles of the openings 270 and 405 cover the entire E/C wheel 265. The warm, moist air stream 160 precipitates moisture onto the surface of the condenser section 260 of the E/C wheel 265. The cool, dry air stream 185 passes through the evaporator section 285 of the E/C wheel 265. A cool air stream 190 exits the E/C wheel 265 as a cold air stream cooled through the evaporative cooling process. The portion of the E/C wheel allocated to the volume air stream 140 may be varied by the needs of the system to start the cooling process or to regulate the relative humidity level in the cabin.

Figure 5:
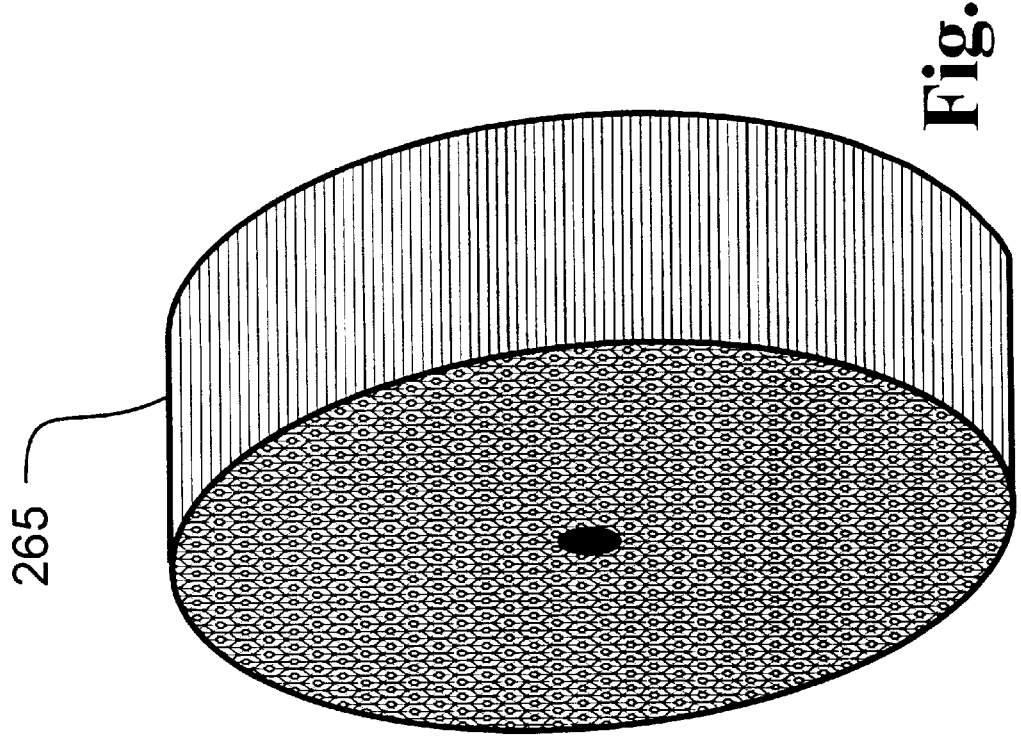
FIG. 5 is an isometric view of a evaporator/condenser wheel.
Figure 6:
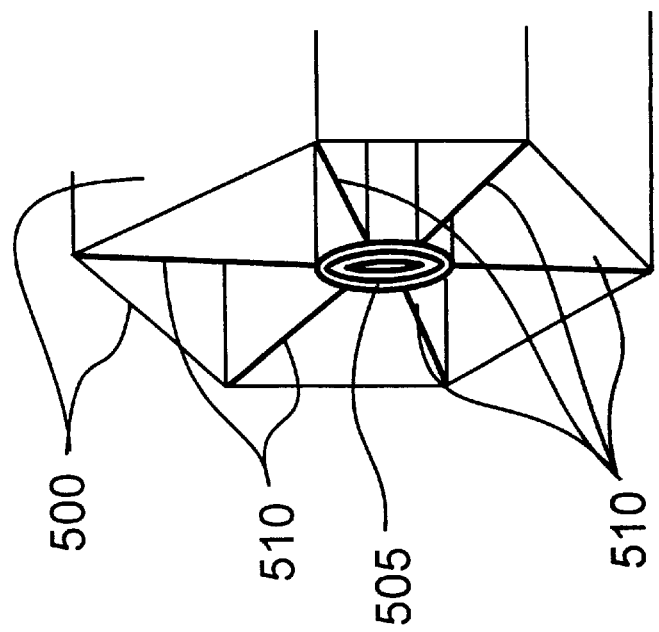
FIG. 6 is a detailed view of a cell of the heat transfer wheel of FIG. 5.

FIGS. 5 and 6 illustrate details of the E/C wheel 265, which has the same structure as the heat exchanger wheels 300 and 305, but may differ in size and material. In general, each cell of the E/C wheel 265 provides a surface on which moisture can condense and evaporate without damage to the surface. Each cell of the wheel is defined by cell walls 500. A center core mass insert 505 is inserted into each cell. The insert 505 may be made from metal, ceramic, glass or any other material that will conduct heat. Fins 510 attached to the insert 505 provide structural support to position the insert 505. The fins 510 also provide conduction paths that transfer heat to and from the air streams passing through the wheel. The fins 510 conduct heat from the air stream to the insert 505 when the insert is cooler than the air stream. When the insert 505 is hotter than the air stream, the fins 510 conduct heat away from the insert. The fins 510 also provide surfaces on which moisture condenses in the condensation section of the E/C wheel 265. The fins 510 and the insert 505 may be manufactured as a single extruded part.

Figure 7:
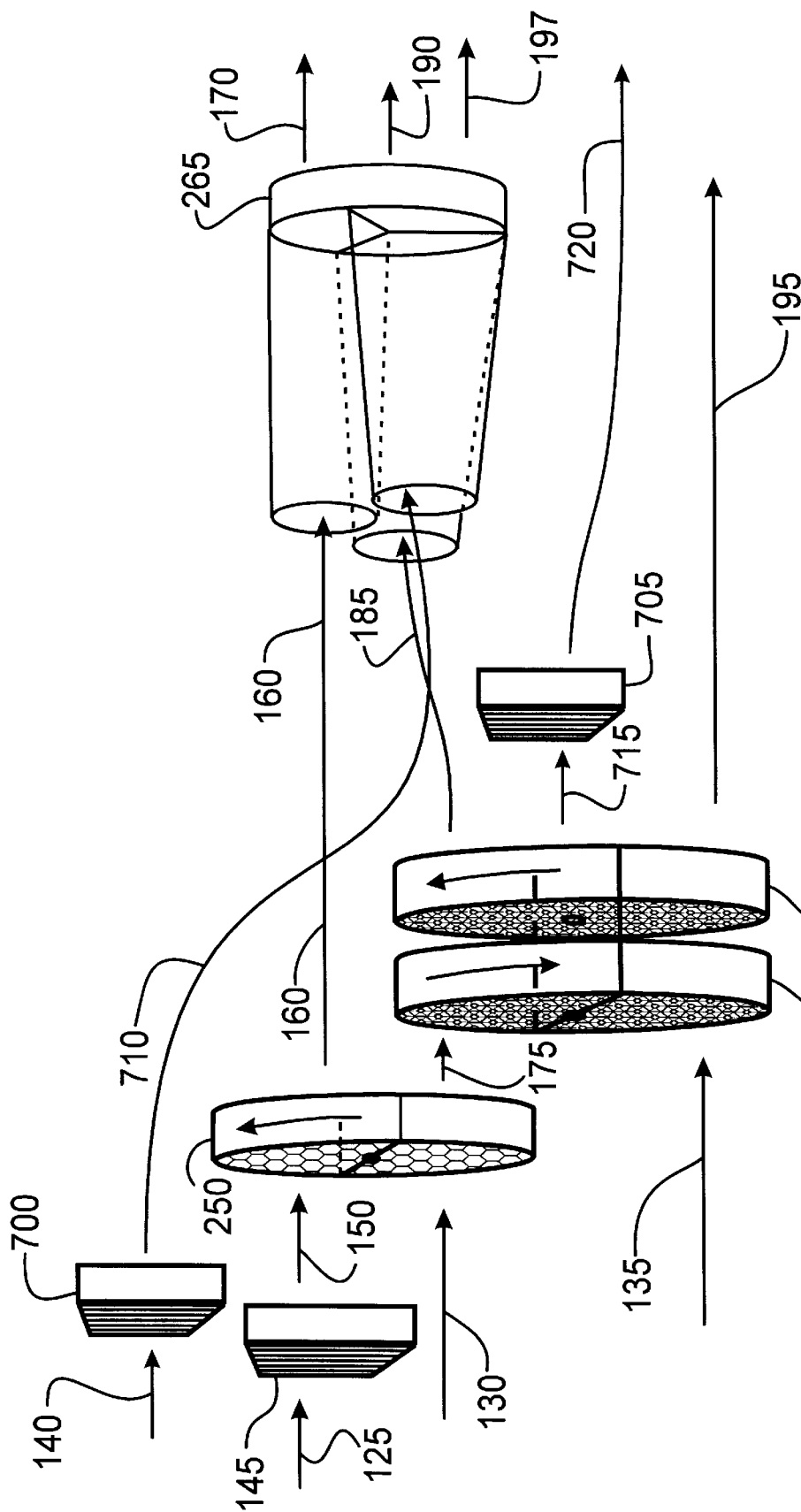
FIG. 7 is a block diagram showing air streams in a hybrid, desiccant and compressor-based air conditioner.

FIG. 7 illustrates air streams of a hybrid, desiccant and compressor-based air conditioner. Elements 700 and 705 are evaporators such as are used in a compressor-based air conditioner. The volume air stream 140 enters evaporator 700 and exits as a cooled volume air stream 710 that provides additional cooling to the E/C wheel 265. The air stream 710 may act as a starter for the desiccant cooling process under certain atmospheric conditions. Air stream 710 cools a section of the E/C wheel 265 before it rotates into the path of the moist air stream 160.

A portion 715 of the air stream 185 may be directed into the cold coils of the compressor-based evaporator 705 to increase the cooling efficiency of the evaporator 705. In this case, air stream 130 first passed through the desiccant wheel 250 to lower the moisture content of the air stream 175 that exits the wheel. Air stream 175 has a low relative humidity and a high temperature. Air stream 175 then enters the air-to-air heat exchanger wheels 300 and 305 where the air temperature is reduced to near ambient. A cold, dry air stream 720 exits the evaporator 705.

The portion 715 of air stream 185 that is directed through the evaporator 705 may be controlled to control the relative humidity in the cabin. The air stream 190 produced by the E/C wheel 265 is cold, moist air that increases the relative humidity of the cabin air and lowers the cabin air temperature. By contrast, the air stream 720 decreases the relative humidity and cools the cabin. The relative humidity level in the cabin may be regulated by varying the portions of the cabin cooling air flow that corresponds to air streams 190 and 720. For example, a vent door positioned downstream of the heat exchanger wheels 300 and 305 may be used to provide this control. When air stream 715 is closed off, the compressor-based evaporator 705 may be turned off.

In another alternative, a single compressor-based evaporator coil may be used to cool both the air stream 140 and the air stream 715. Other implementations may cool just the air stream 140 or just the air stream 715.

Figure 8:
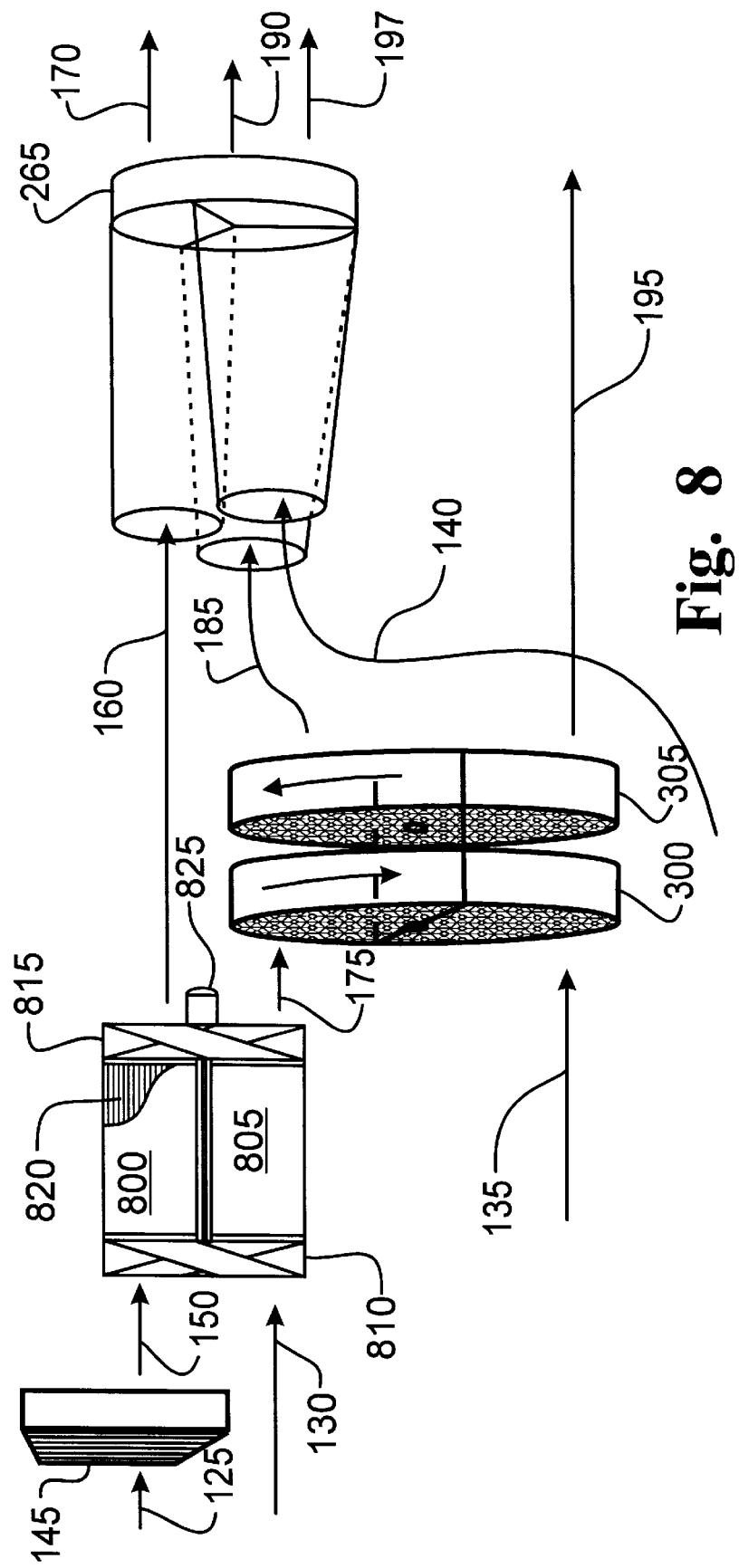
FIG. 8 is a block diagram showing air streams in a system that uses a pair of desiccant canister with cross-over valves in place of the desiccant wheel.

FIG. 8 illustrates air streams in a system that uses a pair of desiccant canisters with cross-over valves instead of the desiccant wheel. The desiccant canisters 800 and 805 are connected to a pair of cross-over valves 810 and 815. The input cross-over valve 810 directs air streams 150 and 130 to the desiccant canisters. The hot air stream 150, which is the regeneration air stream, is first directed by the input cross-over valve 810 into the desiccant canister 800 for the purpose of regenerating the desiccant material coated on the surface of the honeycomb canister filler 820 contained within the canister. Both canisters 800 and 805 have an internal desiccant filler similar to the one shown by the cut away view 820 of the skin of canister 800. After the hot regeneration air stream 150 reacts with the desiccant to remove moisture, the air steam exits the canister 800 through the output cross-over valve 815 as a moisture saturated air stream 160 with a significantly increased relative humidity and a lower temperature. Air stream 160 then is directed into the condenser section of the E/C wheel 265 as described above.

Air stream 130 is directed into the input cross-over valve 810 and then into the other canister 805. As air stream 130 passes through the canister 805, the moisture in the air stream is adsorbed into the desiccant material coated on the surface of the honeycomb structure of the filler of the canister 805. The adsorption lowers the relative humidity of the air stream and increases the temperature as described above with respect to the desiccant wheel. The filler material may be folded paper with desiccant either coated on the surface or impregnated in the material to provide an air channel with high exposure to the desiccant material. After the moisture adsorption occurs in the canister 805, the air stream passes through the output cross-over valve 815 and exits as a dry and hot air stream 175. Air stream 175 is directed into the heat exchanger wheels 300 and 305 as described above.

When the desiccant filler material in canister 805 becomes saturated with moisture from the adsorption cycle, the paths of the air streams 130 and 150 are switched by activation of the cross-over valve drive motor 825, which switches the cross-over valves 810 and 815. After the air streams are switched, air stream 150 is directed into canister 805 to start the regeneration cycle of the desiccant material in the canister. Air stream 130 is directed into canister 800 where the moisture in air stream 130 is adsorbed into the desiccant filler material during the adsorption cycle. Air stream 130 exits canister 800 through the output cross-over valve 815 as a dry, hot air stream 175 that is directed into the heat exchanger wheels 300 and 305.

The cycle of changes in the air flows alternate the processes of regeneration and adsorption for each canister. While an adsorption cycle occurs in one of the canisters, the other canister is in the regeneration cycle. Once the adsorption and regeneration are complete in each canister, the cross-over valves switch the cycle to provide continuous and indefinite reuse of the desiccant. The canisters function similarly to the desiccant wheel described above. An advantage of using the canisters is that the shape and size of the apparatus may be varied to aid in fitting the system into the vehicle. Similar canister arrangements may be used in implementing the heat exchanger and the evaporator/condenser unit.

Referring to FIGS. 9–11, the system 100 may be configured to use solar power to cool a motorized vehicle even when the engine of the vehicle is not running. As shown if FIG. 9, solar heat for the heat exchanger 145 is provided by high temperature solar furnaces 900 mounted, for example, on the roof 905 of an automobile 910. Solar power for operating the system controller, vents, valves, fans and rotating components is provided by photovoltaic cells 915 that also are mounted on the roof of the vehicle.

Referring to FIGS. 10 and 11, a solar furnace 900 includes fluid-filled tubes 920 positioned within magnifying lenses 925. Each lens 925 is partially inserted into an insulation layer 930 between the top surface 935 and bottom surface 940 of the vehicle roof, or between top and bottom surfaces of a panel attached to the roof. A reflective surface 945 is positioned between the lens and the insulation layer to direct light toward the tube 920. Fluid heated by the furnaces 910 is directed to the heat exchanger 145 to produce the hot regeneration air stream 150.

Referring again to FIG. 1, the controller 105 controls operation of system components in response to signals received from sensors 110 and from user-manipulable control mechanisms 115. The sensors may measure the temperature and humidity of the air in the cabin of the vehicle, the temperature of the vehicle windshield, and the level of condensation on the windshield. Other sensors may measure the humidity and temperature outside of the vehicle or the temperature and operating parameters of system components. The user-manipulable control mechanism may indicate a desired temperature and humidity, or that the temperature and/or humidity should be increased or decreased. Details of controllers for different applications are described in U.S. application Ser. No. 08/771,892, filed Dec. 23, 1996 and entitled "DESICCANT BASED HUMIDIFICATION/DEHUMIDIFICATION SYSTEM", which, as noted above, is incorporated by reference.

In general, the controller 105 may include a microprocessor that generates control signals for controlling the system components automatically in response to signals received from the sensors and user-manipulable control mechanisms. The controller monitors environmental conditions to select appropriate settings for the direct and complete regulation of environmental conditions such as temperature, relative humidity, fan speed, defrosting of the windshield, air vent selection, and other comfort, safety, and efficiency features. The automatic controller prevents distraction of the driver and vehicle passengers that would result if only manual controls were provided for activating and deactivating system components.

In a simple system, two sets of temperature and relative humidity sensors may be used to measure the temperature and relatively humidity of the front seat cabin area and the air mass close to the windshield of the vehicle. Additional sensors may be added to permit the controller to distinguish between environmental conditions for the left and right front seats, and to monitor the temperature and relative humidity at the rear seats of the vehicle. The automatic controller uses the information received from the sensors to determine which components to activate or deactivate and may display some of the information to the occupants of the passenger cabin.

Other embodiments are within the scope of the following claims.

What is claimed is:

1. A method for providing cooling air to a passenger cabin of a motorized vehicle, comprising generating cooling air by:

(a) directing high temperature air into a desiccant-based moisture collector, the high temperature air having a temperature sufficient to evaporate moisture from desiccant of the moisture collector and into the high temperature air so that humidified air exits the moisture collector;

(b) directing the humidified air from the moisture collector into a condensation section of an evaporator/condenser unit to condense moisture from the humidified air onto a surface of the evaporator/condenser unit;

(c) directing low temperature air into the moisture collector, the low temperature air having a temperature low enough that the desiccant of the moisture collector collects moisture from the air and dehumidified air exits the moisture collector;

(d) directing the dehumidified air through a heat exchanger to cool the dehumidified air;

(e) directing the cooled, dehumidified air through an evaporator section of the evaporator/condenser unit to humidify and further cool the air to produce a cold, moist air stream; and (f) directing the cold, moist air stream into the passenger cabin of the motorized vehicle.

2. The method of claim 1, wherein the desiccant-based moisture collector comprises:

a rotatable wheel that includes the desiccant in air passages between a first side of the wheel and a second side of the wheel, a first region where the high temperature air enters the moisture collector, a second region where the low temperature air enters the moisture collector, a third region opposite the first region where the humidified air exits the moisture collector, and a fourth region opposite the second region where the dehumidified air exits the moisture collector;

the method further comprising:

rotating the rotatable wheel so that desiccant on the wheel is alternately exposed to the first region and the second region.

3. The method of claim 1, wherein the desiccant-based moisture collector comprises a canister that contains desiccant and includes an inlet and an outlet, an inlet valve connected to the inlet of the canister, and an outlet valve connected to the outlet of the canister, the method further comprising:

controlling the inlet valve to alternately direct the high temperature air and the low temperature air through the canister; and controlling the outlet valve so that air exiting the canister is directed to the condensation section of the evaporator/condenser unit when high temperature air is directed through the canister and is directed to the heat exchanger when low temperature air is directed through the canister.

4. The method of claim 3, wherein the moisture collector further comprises a second canister that contains desiccant and includes an inlet connected to the inlet valve and an outlet connected to the outlet valve, the method further comprising:

controlling the inlet valve to direct the high temperature air through the second canister when the low temperature air is directed through the first canister and to direct the low temperature air through the second canister when the high temperature air is directed through the first canister; and controlling the outlet valve so that air exiting the second canister is directed to the condensation section of the evaporator/condenser unit when air exiting the first canister is directed to the heat exchanger and so that air exiting the second canister is directed to the heat exchanger when air exiting the first canister is directed to the condensation section of the evaporator/condenser unit.

5. The method of claim 4, wherein the inlet and outlet valves comprise a pair of connected cross-over valves.

6. The method of claim 1, further comprising generating the high temperature air using heat from an engine of the motorized vehicle.

7. The method of claim 1, further comprising generating the high temperature air using solar energy.

8. The method of claim 1, wherein the evaporator/condenser unit comprises a rotatable wheel having air passages between a first side of the wheel and a second side of the wheel, the method further comprising rotating the rotatable wheel so that a particular air passage is positioned alternately in the evaporation section and the condensation section of the evaporator/condenser unit.

9. The method of claim 1, further comprising generating a cool air stream using a compressor-based evaporator and directing the cool air stream through the evaporator/condenser unit.

10. The method of claim 1, further comprising directing the cooled, dehumidified air through a compressor-based evaporator to produce a cold, dry air stream; and directing the cold, dry air stream into the passenger cabin of the motorized vehicle.

11. The method of claim 10, further comprising controlling a relative humidity in the passenger cabin of the motorized vehicle by allocating the cooled, dehumidified air between the evaporator section of the evaporator/condenser unit and the compressor-based evaporator.

12. The method of claim 11, further comprising measuring a relative humidity level in the passenger cabin, wherein controlling the relative humidity in the passenger cabin comprises controlling the relative humidity based on a difference between the measured relative humidity level and a desired relative humidity level.

13. The method of claim 12, further comprising receiving the desired relative humidity level from an occupant of the passenger cabin.

14. The method of claim 1, further comprising heating and humidifying the passenger cabin of the motorized vehicle by directing the humidified air that exits the moisture collector into the passenger cabin.

15. The method of claim 1, further comprising directing the dehumidified air that exits the moisture collector to a windshield of the motorized vehicle.

16. The method of claim 1, further comprising directing the cooled, dehumidified air that exits the heat exchanger to a windshield of the motorized vehicle.

17. A system for providing cooling air to a passenger cabin of a motorized vehicle, comprising:

a heat source configured to generate high temperature air;

a desiccant-based moisture collector including desiccant and configured to receive the high temperature air, to evaporate moisture from the desiccant into the high temperature air to produce humidified air when the high temperature air has a temperature sufficient to evaporate moisture from the desiccant, to receive low temperature air, to adsorb moisture from the low temperature air into the desiccant to produce dehumidified air when the low temperature air has a temperature low enough that the desiccant collects moisture from the air;

an evaporator/condenser unit having a condensation section and an evaporation section, the condensation section being configured to receive the humidified air from the moisture collector and condense moisture from the humidified air onto a surface of the evaporator/condenser unit, and the evaporation section being configured to humidify and cool air passing through the evaporation section;

a heat exchanger configured to receive and cool the dehumidified air from the moisture collector, and to provide the cooled, dehumidified air to the evaporator section of the evaporator/condenser unit; and a duct configured to direct air from the evaporator section of the evaporator/condenser unit into the passenger cabin of the motorized vehicle.

18. The system of claim 17, wherein the desiccant-based moisture collector comprises:

a rotatable wheel that includes a desiccant material in air passages between a first side of the wheel and a second side of the wheel, a first region where the high temperature air enters the moisture collector, a second region where the low temperature air enters the moisture collector, a third region opposite the first region where the humidified air exits the moisture collector, and a fourth region opposite the second region where the dehumidified air exits the moisture collector;

the system further comprising a mechanism for rotating the rotatable wheel so that desiccant material on the wheel is alternately exposed to the first region and the second region.

19. The system of claim 17, wherein the desiccant-based moisture collector comprises a canister that contains desiccant material and includes an inlet and an outlet, an inlet valve connected to the inlet of the canister, and an outlet valve connected to the outlet of the canister, the system further comprising:

a controller configured to:

control the inlet valve to alternately direct the high temperature air and the low temperature air through the canister; and control the outlet valve so that air exiting the canister is directed to the condensation section of the evaporator/condenser unit when high temperature air is directed through the canister and is directed to the heat exchanger when low temperature air is directed through the canister.

20. The system of claim 19, wherein:

the moisture collector further comprises a second canister that contains desiccant material and includes an inlet connected to the inlet valve and an outlet connected to the outlet valve; and the controller is further configured to:

control the inlet valve to direct the high temperature air through the second canister when the low temperature air is directed through the first canister and to direct the low temperature air through the second canister when the high temperature air is directed through the first canister, and control the outlet valve so that air exiting the second canister is directed to the condensation section of the evaporator/condenser unit when air exiting the first canister is directed to the heat exchanger and so that air exiting the second canister is directed to the heat exchanger when air exiting the first canister is directed to the condensation section of the evaporator/condenser unit.

21. The system of claim 20, wherein the inlet and outlet valves comprise a pair of connected cross-over valves.

22. The system of claim 17, wherein the heat source comprises a heat exchanger configured to generate the high temperature air using heat from an engine of the motorized vehicle.

23. The system of claim 17, wherein the heat source is configured to generate the high temperature air using solar energy.

24. The system of claim 17, wherein the evaporator/condenser unit comprises a rotatable wheel having air passages between a first side of the wheel and a second side of the wheel, the wheel being rotatable so that a particular air passage is positioned alternately in the evaporation section and the condensation section of the evaporator/condenser unit.

25. The system of claim 17, further comprising a compressor-based evaporator configured to generate a cool air stream and direct the cool air stream through the evaporator/condenser unit.

26. The system of claim 17, further comprising a compressor-based evaporator configured to receive the cooled, dehumidified air; to produce a cold, dry air stream; and to direct the cold, dry air stream into the passenger cabin of the motorized vehicle.

27. The system of claim 26, further comprising a mechanism for controlling a relative humidity in the passenger cabin of the motorized vehicle by allocating the cooled, dehumidified air between the evaporator section of the evaporator/condenser unit and the compressor-based evaporator.

28. The system of claim 27, further comprising a sensor configured to measure a relative humidity level in the passenger cabin, and a controller configured to control the mechanism to control the relative humidity in the passenger cabin based on a difference between the measured relative humidity level and a desired relative humidity level.

29. The system of claim 28, wherein the controller is further configured to receive a signal representing the desired relative humidity level from an occupant of the passenger cabin.

30. The system of claim 17, further comprising a duct configured to heat and humidify the passenger cabin of the motorized vehicle by directing the humidified air that exits the moisture collector into the passenger cabin.

31. The system of claim 17, further comprising a duct configured to direct the dehumidified air that exits the moisture collector to a windshield of the motorized vehicle.

32. The system of claim 17, further comprising a duct configured to direct the cooled, dehumidified air that exits the heat exchanger to a windshield of the motorized vehicle.

* * * * *